(12) United States Patent
Tancerel et al.

(10) Patent No.: US 11,191,058 B2
(45) Date of Patent: Nov. 30, 2021

(54) UWB LOCATING METHOD WITH AUXILIARY CHANNEL SYNCHRONISATION

(71) Applicant: MAPLE HIGH TECH, Toulouse (FR)

(72) Inventors: Ludovic Tancerel, Toulouse (FR); William Begoc, Toulouse (FR); Christophe Pavot, Labarthe sur Leze (FR)

(*) Notice: Subject to any disclaimer, the term of this patent is extended or adjusted under 35 U.S.C. 154(b) by 110 days.

(21) Appl. No.: 16/496,570

(22) PCT Filed: Mar. 23, 2018

(86) PCT No.: PCT/FR2018/050715
§ 371 (c)(1),
(2) Date: Sep. 23, 2019

(87) PCT Pub. No.: WO2018/172721
PCT Pub. Date: Sep. 27, 2018

(65) Prior Publication Data
US 2021/0105736 A1    Apr. 8, 2021

(30) Foreign Application Priority Data

Mar. 24, 2017    (FR) ...................................... 1752482

(51) Int. Cl.
*H04W 64/00* (2009.01)
*H04W 4/80* (2018.01)
(Continued)

(52) U.S. Cl.
CPC ....... *H04W 64/006* (2013.01); *G01S 5/02213* (2020.05); *G01S 13/0209* (2013.01); *H04W 4/80* (2018.02); *H04W 56/001* (2013.01)

(58) Field of Classification Search
CPC ... H04W 64/006; H04W 4/80; H04W 56/001; H04W 56/00; G01S 5/02213; G01S 13/0209; G01S 5/10
See application file for complete search history.

(56) References Cited

U.S. PATENT DOCUMENTS 6,377,203 B1* 4/2002 Doany ................ G06K 7/0008
342/44
2008/0186231 A1    8/2008 Aljadeff et al.
(Continued)

FOREIGN PATENT DOCUMENTS

FR    2 924 818 A1    6/2009
WO    2012/059903 A2    5/2012

OTHER PUBLICATIONS

Kasun Maduranga Silva Thotahewa et al.: "MAC Protocols for UWB-Based WBAN Applications" in: "Ultra Wideband Wireless Body Area Networks", Apr. 18, 2014, Springer International Publishing, Cham, XP055432807.

(Continued)

Primary Examiner — Kabir A Timory
(74) Attorney, Agent, or Firm — Pearne & Gordon LLP

(57) ABSTRACT

A method for locating a tag by a network of sensors using the IEEE 802.15.4a protocol. The reference anchor of the network sends a UWB signal comprising first beacons at regular intervals, and a narrow band signal on an auxiliary channel, comprising second beacons, the second beacons being in synchronous relation with the first beacons. The tag negotiates with a coordinator anchor, via the auxiliary channel, the allocation of an elementary interval within the UWB superframe. When an elementary interval is allocated to the tag, it places its narrow band receiver in standby mode and sends a clap message in the elementary interval.

10 Claims, 5 Drawing Sheets

(51) Int. Cl.
G01S 5/02 (2010.01)
G01S 13/02 (2006.01)
H04W 56/00 (2009.01)

(56) References Cited

U.S. PATENT DOCUMENTS

| | | | |
|---|---|---|---|
| 2011/0065440 A1* | 3/2011 | Kakani | H04L 1/0022 |
| | | | 455/450 |
| 2014/0035732 A1 | 2/2014 | Karr et al. | |
| 2016/0266234 A1* | 9/2016 | Pearce | G01S 17/86 |
| 2019/0068441 A1 | 2/2019 | Tancerel et al. | |

OTHER PUBLICATIONS

International Search Report for International Application No. PCT/FR2018/050715, dated Jun. 5, 2018.
Preliminary French Search Report for Application No. 1752482, dated Dec. 7, 2017.

* cited by examiner

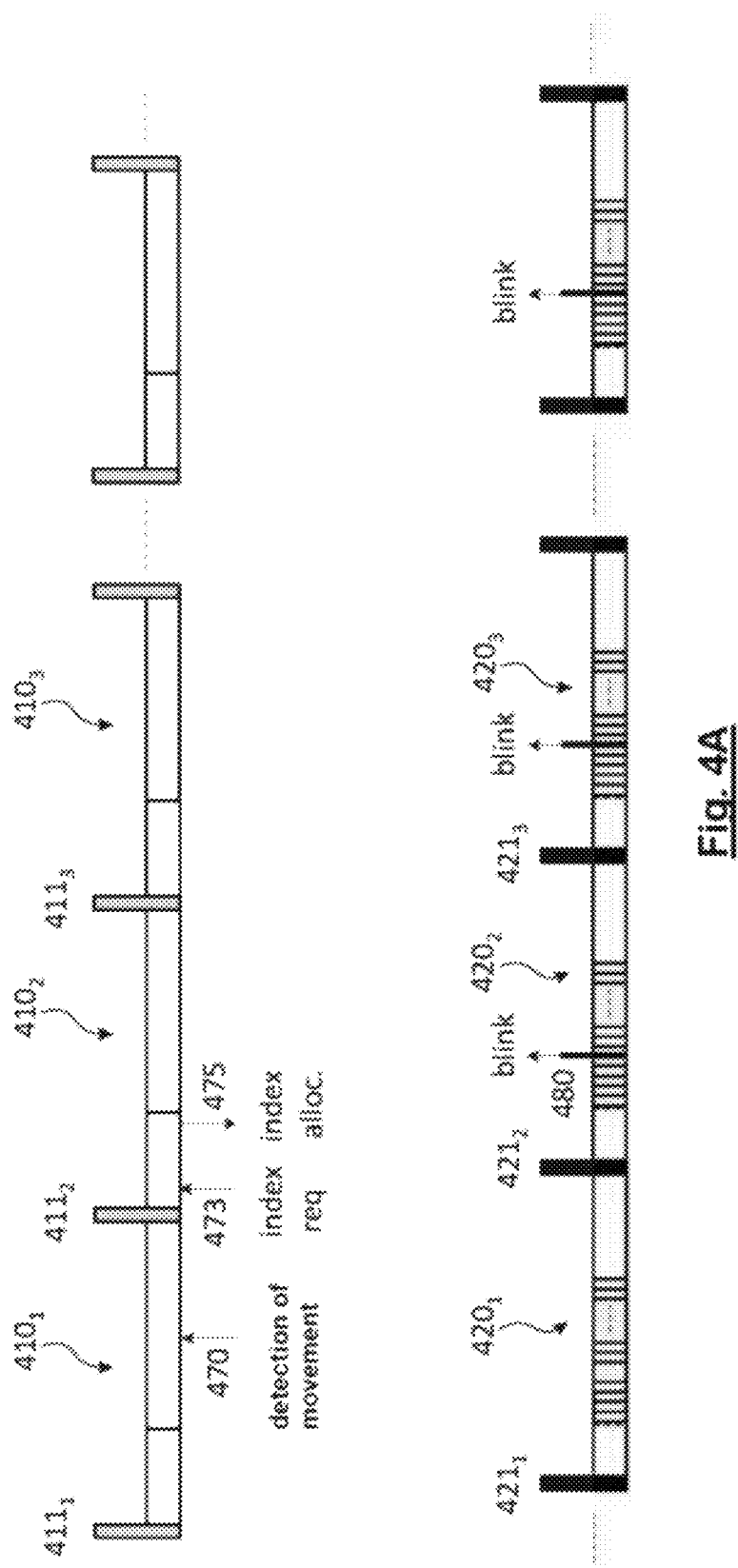

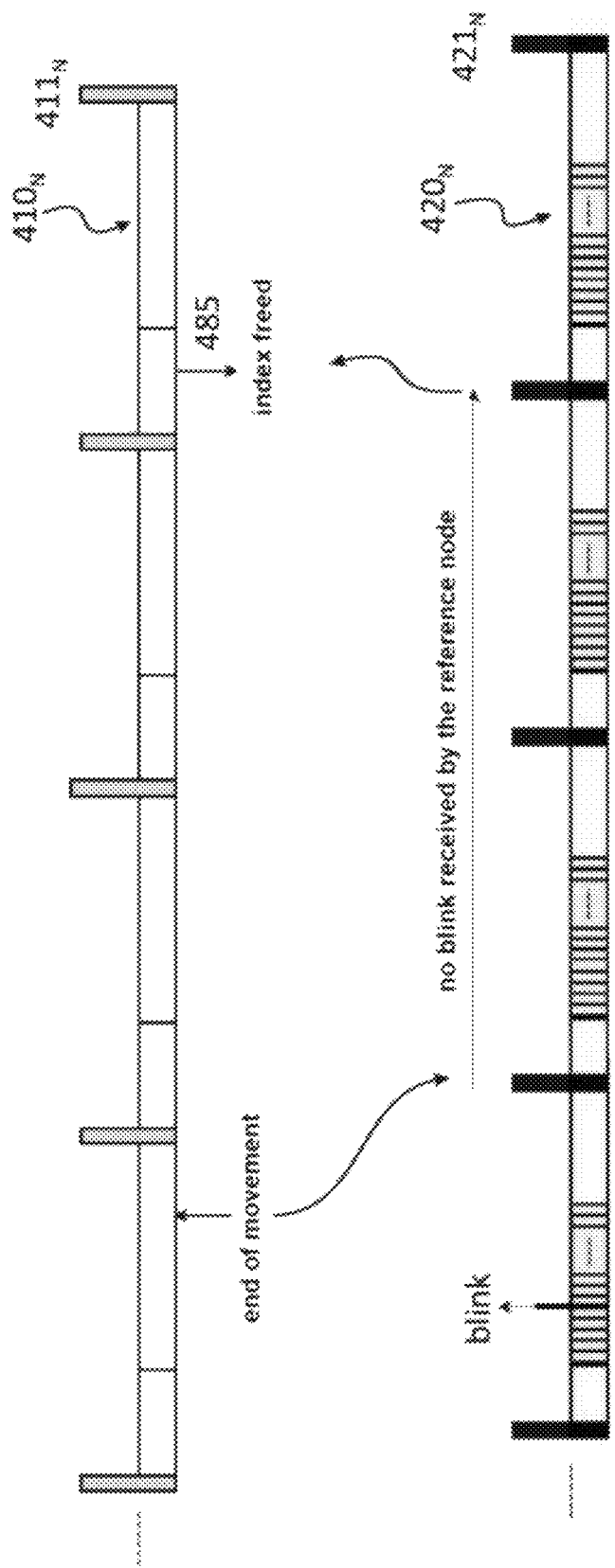

UWB LOCATING METHOD WITH AUXILIARY CHANNEL SYNCHRONISATION

TECHNICAL FIELD

The present invention relates in general to the field of location via a network of wireless sensors or WSN (Wireless Sensor Network) and more particularly a network using UWB (Ultra Wide Band) transmission.

PRIOR ART

The systems for location via a network of sensors (WSN) constitute an attractive alternative to satellite positioning systems (GPS, Galileo), particularly for an indoor environment.

As a reminder, a WSN network is a wireless network generally comprising a large number of nodes capable of carrying out measurements and transmitting them autonomously. The position of the nodes, also sometimes called access points (APs), in such a network is not necessarily known. When a node of the network knows its position, the latter is called "anchor node" or simply anchor.

UWB technology, because of its very-wide-band transmission and consequently its very fine temporal resolution, is well suited to the uses of location. It is thus known to determine the position of a tag on the basis of the differences in arrival time or TDOA (Time Difference Of Arrival) of a UWB signal emitted by this tag and received by the various anchor nodes. However, the location is only possible if the nodes of the network, or at least the anchor nodes within range of this tag, are synchronised (in such a way as to be able to calculate the differences in arrival time).

A first method for synchronisation involves using a wired network between the anchor nodes. However, the installation of a wired network is inconvenient and supposes that the topology of the network remains unchanged.

The international application WO-A-2012/059903 describes a method for synchronisation of nodes in a UWB communication network in order to locate a tag. The synchronisation of the nodes occurs here via a synchronisation message transmitted by a coordinating anchor to the other nodes and the sending back, by the latter, of response messages timestamped by the arrival times of the synchronisation messages. A centralised location device CLE (Central Location Engine) determines, on the basis of the emission time, the arrival times and the times of flight between the nodes, the clock skew between the nodes and the coordinating anchor which allows to synchronise the nodes of the network.

In any case, the location of a tag involves the emission of a pulse or of a brief message, also called clap message or "blink". This clap message is received by the anchor nodes previously synchronised with the coordinating anchor. The various arrival times are then determined by the coordinating anchor, or even by a distinct server, and the position of the tag is deduced from these differences in arrival time.

The emission of a clap message cannot, however, occur at any given time, otherwise this clap message could collide with a synchronisation message or even with a clap message emitted by another tag, during its reception by an anchor node. Thus, in order to avoid collisions, the tag must synchronise its emission with respect to a time frame shared by all of the nodes of the network. In the standard IEEE 802.15.4 (in beacon mode), this time frame is defined by a beacon signal periodically emitted by the coordinating anchor. The tag listens to the beacon signal and transmits a clap message in a time interval that is allocated to it in the time frame. However, this listening to the beacon signal consumes a lot of energy, in particular because of the complexity of the UWB receiver, even though the energy resources of a tag are very limited. Batteries having a significant bulk and a high cost must thus be used.

The goal of the present invention is to propose a method for UWB location by a network of sensors in which the synchronisation of the emission of the tags consumes less energy than in the prior art.

DESCRIPTION OF THE INVENTION

The present invention is defined by a method for location of a tag by a network of sensors, the network of sensors comprising a reference anchor and a plurality of anchors synchronised with said reference anchor, the reference anchor emitting a UWB signal comprising first beacons at regular intervals, the interval between two successive first beacons defining a first time frame comprising elementary time intervals during which the sensors and the tag can access a UWB channel, said method further comprising:

the transmission by the reference anchor of a narrowband signal over an auxiliary channel, the narrowband signal comprising second beacons at regular intervals, the interval between two successive second beacons defining a second time frame, the second beacons being synchronous with the first beacons, the reference anchor transmitting an elementary interval index to said tag during the second time frame;

the reception by said tag of said index over the auxiliary channel and the transmission by said tag of a clap message over the UWB channel during an elementary interval associated with said index;

the reception by said anchors of the clap message and the determination of the differences in arrival time of this message to the various anchors;

the calculation of the position of the tag on the basis of the differences in arrival time thus determined.

Said tag is advantageously provided with a narrowband emitter/receiver adapted for emitting/receiving over the auxiliary channel and places its narrowband receiver on standby after having received the elementary-interval index allocated by the reference anchor.

Said tag can be further provided with a UWB emitter without an associated UWB receiver.

According to one embodiment, said tag is provided with a motion sensor and said tag transmits a request for an elementary-interval index to the reference node when a movement of the tag is detected.

In this case, said tag cannot emit the request for an elementary-interval index unless said movement lasts longer than a predetermined period of time.

If the reference anchor does not receive any clap message from the tag during an interval having a predetermined length, the reference anchor then frees the elementary-interval index allocated to the tag.

According to one example of implementation, the UWB signal is compliant with the physical layer standardised by the standard IEEE 802.15.4a and the access to the UWB channel is compliant with the MAC layer standardised by this standard.

Moreover, the narrowband signal can be compliant with the physical layer standardised by the standard IEEE 802.15.4 and the access to the auxiliary channel compliant with the MAC layer standardised by this standard.

The narrowband signal can for example be an RFID signal or a Bluetooth Low Energy signal.

BRIEF DESCRIPTION OF THE DRAWINGS

Other features and advantages of the invention will appear upon reading a preferred embodiment of the invention, made in reference to the appended drawings among which:

FIGS. 4A-4B show an example of sequences of UWB superframes and narrowband superframes used by a location method according to a second embodiment of the invention.

DETAILED DESCRIPTION OF SPECIFIC EMBODIMENTS

Figure 1:
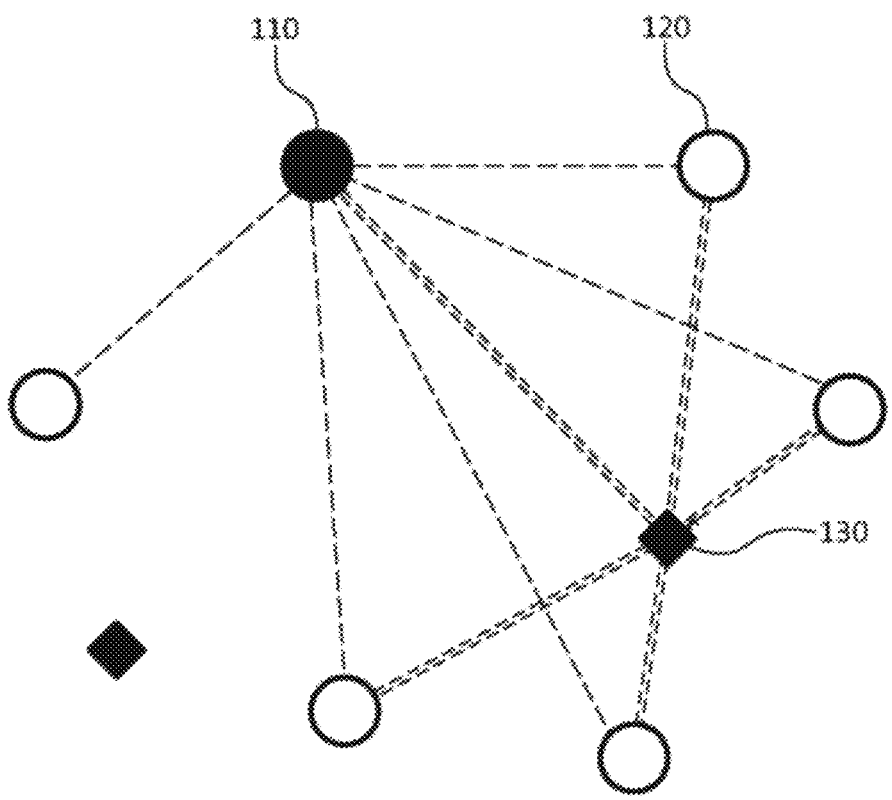
FIG. 1 schematically shows a network of sensors for the location of a tag according to the location method of the invention.

Below, a network of wireless sensors (WSN) with a given topology, an example of which is schematically shown in FIG. 1, will be considered. This network comprises at least one coordinating anchor 110 and a plurality of anchor nodes 120. As a reminder, the positions of the anchor nodes and of the coordinating anchor are determined and known. The network can comprise a plurality of coordinating anchors organised in a tree-like manner, each coordinating anchor being responsible for the synchronisation of a subset of anchor nodes and being itself synchronised by means of a coordinating anchor of a higher level. The coordinating anchor at the root of the tree (level 0) is responsible for the synchronisation of all the nodes of the network and named for this reason reference node. In order to simplify the description but without losing generality, it will be supposed hereinafter, unless otherwise mentioned, that the network only comprises a single coordinating anchor (and thus reference anchor).

The anchor nodes 120 are synchronised with the reference anchor, 110, by means of a beacon signal, named more simply beacon, transmitted periodically by the reference node. More precisely, the reference anchor transmits, in broadcast mode, a UWB signal comprising first beacons at regular intervals, the interval between two successive first beacons defining a first time frame, also called UWB superframe. The anchor nodes 120 (and in general the anchor nodes of the network which are not coordinating anchors) do not transmit any beacons.

Since each anchor 120 has its own local clock, the synchronisation allows to obtain a relationship that is stable over time between the local clocks and the clock of the reference node. According to a particular mode, after synchronisation, the local clocks have the same frequency and the same phase as the clock of the reference node. It should be noted, however, that the synchronisation of the anchors is not part of the present invention. This synchronisation can be carried out for example as described in the aforementioned international application or as described in the application n° FR 16 55026 filed by the applicant and incorporated here by reference.

The reference anchor is also adapted for transmitting a narrowband signal over an auxiliary channel. A narrowband signal means a signal, the bandwidth of which is at least ten times less and preferably at least one hundred times less than the bandwidth of the UWB signal.

The narrowband signal comprises second beacons at regular intervals, the interval between two successive second beacons defining a second time frame, also called narrowband superframe.

The reference anchor 110 and the anchor nodes 120 are provided with a UWB emitter/receiver. According to the invention, the reference anchor is further provided with a narrowband emitter/receiver for emitting/receiving over the auxiliary channel.

For example, the UWB signal is transmitted according to the specifications of the protocol IEEE 802.15.4a in the channel 0 occupying the spectral band from 249.6 to 749.6 MHz or in one of the four channels 1-4 occupying the spectral band from 3.1 to 4.8 GHz or even in one of the eleven channels 5-15 occupying the spectral band from 5.8 to 10.6 GHz.

Similarly, and still as an example, the narrowband signal is transmitted according to the specifications of the protocol IEEE 802.15.4 (ZigBee) either over the sub-GHz channel or in one of the channels 11-26 occupying the spectral band 2400-2483.5 MHz, with a bandwidth of 5 MHz.

According to an advantageous example, the UWB signal is transmitted over the channel 2 or the channel 5 (respectively at 3.9 GHz and 6 GHz) and the narrowband signal over one of the channels 11-26 (2400-2483.5 MHz), without having a risk of interference between the UWB channel and the narrowband channel.

Alternatively, the narrowband signal can be an RFID signal or a Bluetooth Low Energy (BLE) signal.

Regardless of the type of auxiliary channel chosen, the second beacons are chosen to be synchronous with the first beacons. In other words, although the first and second beacons are emitted over different channels, they are always emitted in a stable temporal relationship. According to a specific example of realisation, the first and second beacons are emitted at the same times.

Each tag to be located, 130, comprises a UWB emitter in order to emit, in broadcast mode, a clap message in an elementary time interval which will be specified below. Moreover, each tag 130 comprises an emitter-receiver NB adapted for emitting and receiving a narrowband signal. In particular, the receiver NB is adapted for receiving the narrow band signal emitted by the reference node.

When the UWB signal is emitted according to the protocol IEEE 802.15.4a and the narrowband signal is emitted according to the protocol IEEE 802.15.4, it is possible to use a chipset implementing the emission/reception according to these two protocols. Alternatively, it can be advantageous to use a narrowband emitter/receiver associated with a UWB emitter without a UWB receiver.

Figure 2:
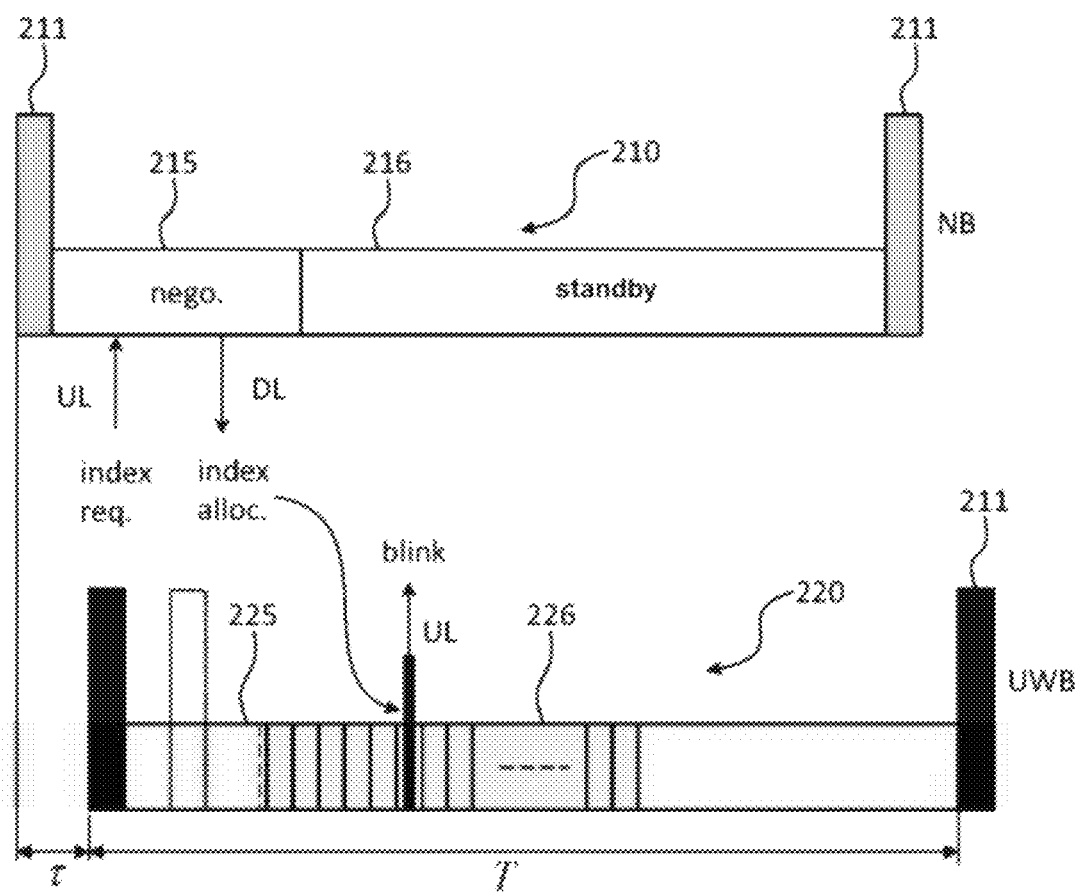
FIG. 2 schematically shows a UWB superframe and a narrowband superframe used by the location method according to a first embodiment of the invention.

FIG. 2 schematically shows a narrowband superframe, 210, as well as a UWB superframe, 220.

The UWB superframe is defined by successive first beacons 221 emitted by the reference anchor.

Likewise, the narrowband superframe (NB) is defined by successive second beacons 211 emitted by the reference anchor.

As indicated above, the temporal relationship between the first and the second beacons is fixed. This fixed temporal relationship can be due to an integer ratio between the lengths of the superframes and/or to a fixed delay between the superframes. In the example shown in FIG. 2, it has been supposed that the superframes 210 and 200 have the same length and have simply been offset by a delay r.

A first period (called negotiation period), 215, of the narrowband superframe, is dedicated to the negotiation of an elementary-interval index for the emission of a clap message. More precisely, during this period, each tag can request the reference anchor to allocate it an elementary-interval index in the UWB superframe. It should be noted that the index-allocation message is not necessarily sent during the same narrowband superframe as shown in the drawing, but can optionally be sent during the period of negotiation of the following superframe or even a later superframe. As soon as the tag has received an index-allocation message or the period 215 of negotiation of the superframe is over, the tag places its narrowband receiver on standby until the next beacon. Alternatively, as soon as the tag has received an index-allocation message, the tag can place its narrowband receiver on standby (that is to say inactive) for a predetermined number of superframes. This is in particular the case if the elementary-frame index is allocated to the tag for a predetermined time: the tag thus reactivates its narrowband receiver only after this time has passed or, in an equivalent manner, only after a corresponding number of superframes.

In any case, the tags place their narrowband receiver on standby during the second period 216 of the superframe 210. Thus, the narrowband receiver of the tag only consumes little energy. Moreover the energy consumed while the narrowband receiver is activated is substantially less than that which would have been consumed by a UWB receiver during the same period. Indeed, a UWB receiver is substantially more complex and energy-consuming that a narrowband receiver (for example a receiver compliant with the standard 802.15.4 at 2.4 GHz).

The UWB superframe, 220, comprises a first period 225 during which the coordinating anchors can transmit their beacons. In the case illustrated, since the reference anchor alone is a coordinating anchor, the period 225 only comprises a single beacon. This first period is followed by a second period divided into elementary intervals, each elementary interval being associated with an index. When an elementary-interval index is allocated to the tag, the latter can emit a clap message in the elementary interval. The clap message is a UWB message consisting of a train of very brief pulses, generally encoded, which is well suited to measurements of distance. Advantageously, when a plurality of coordinating anchors are present in the network, each coordinating anchor can be assigned the management of a subset of indices, the indices of the same subset corresponding to elementary indices separated by a predetermined holding time. Thus, tags having indices that are managed by the same coordinating anchor emit their clap messages at times sufficiently spaced apart temporally to eliminate any risk of collision. If necessary, when two coordinating anchors are sufficiently distant from one another, the index subsets that they respectively manage can have a non-empty intersection. In other words, elementary-index intervals can be reused for allocation when the risk of collision between messages is low.

It is understood that the request and the allocation of indices are carried out via the auxiliary channel during a negotiation period instead of being carried out during the relatively short period, 225, dedicated to the beacons in the UWB frame. The location of a large number of tags can thus be supported.

Figure 3:
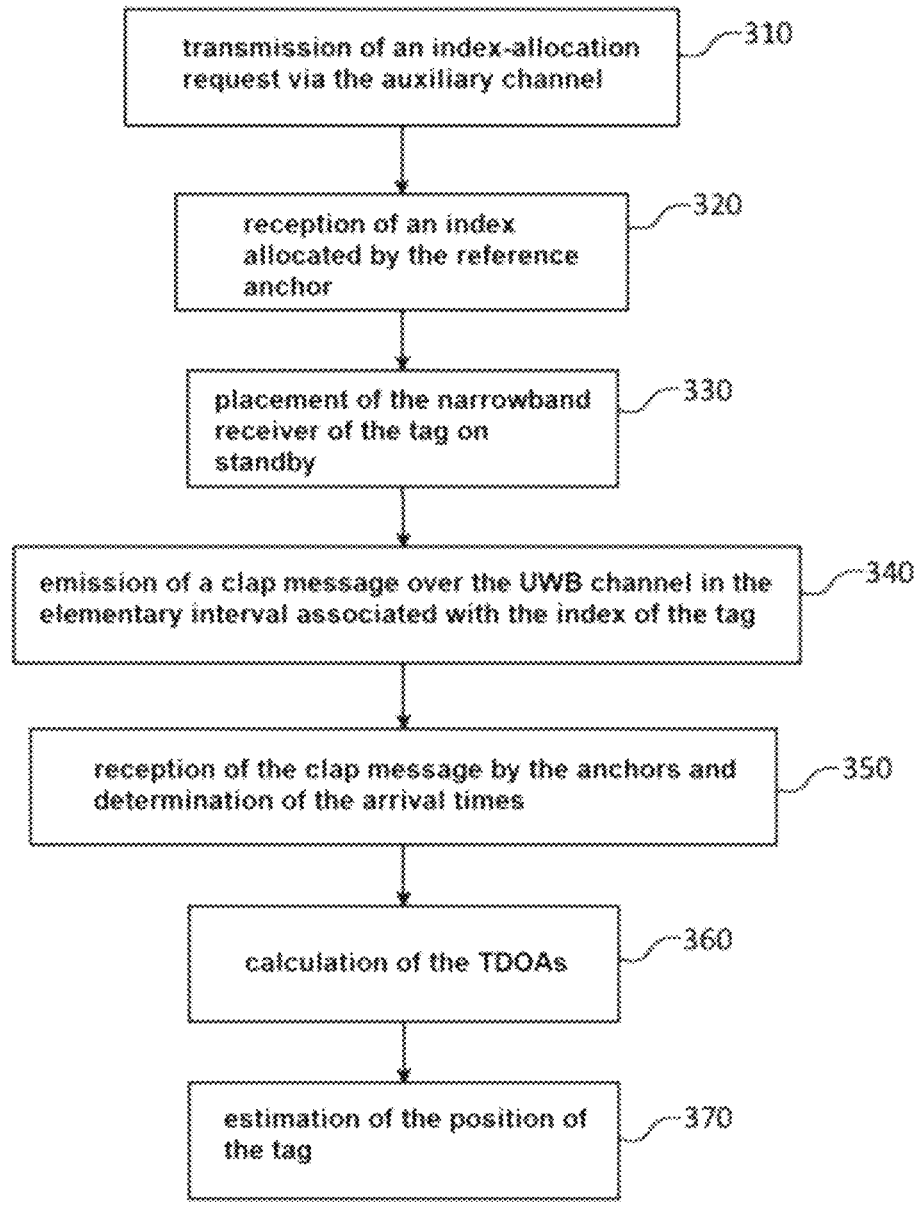
FIG. 3 schematically shows a flowchart of the location method according to a first embodiment of the invention.

FIG. 3 shows a flow chart of the method for location of a tag according to a first embodiment of the invention.

The location method uses a network of sensors as described in relation to FIG. 1.

The reference anchor transmits a UWB signal comprising first beacons at regular intervals, the interval between two successive first beacons defining a first time frame or UWB superframe as described in relation to FIG. 2.

As a reminder, these beacons allow the synchronisation of the anchors.

Likewise, the reference anchor transmits a narrowband signal over an auxiliary channel, the narrowband signal comprising second beacons at regular intervals, the interval between two successive second beacons defining a second time frame or narrowband superframe as described in relation to FIG. 2.

It is supposed that the tag has been previously associated with the network in a manner known per se. This association can take place via the UWB channel or, advantageously, via the narrowband auxiliary channel.

During the association, the tag can recover the parameters of the network, in particular the period of recurrence of the UWB superframes and of the narrowband superframes and, if necessary the temporal offset $\tau$ between these frames.

In step 310, the tag transmits, to the reference anchor (or to the coordinating anchor), via the auxiliary channel, a request for allocation of an elementary interval during a period of negotiation.

In step 320, the tag receives, from the reference anchor (or from the coordinating anchor), via the auxiliary channel, an elementary-interval index.

In step 330, the tag places its narrowband receiver on standby for a predetermined time.

In step 340, the tag emits a clap message in the elementary interval (of the UWB superframe) corresponding to the index that has been previously allocated to it. This emission can be repeated at each UWB superframe posterior to the allocation of the index, during a predetermined period of validity of the allocation.

In step 350, the anchors within reach of the tag receive the clap message and determine their respective arrival times by means of their local clocks. They then transmit these arrival times to the reference anchor (or to the coordinating anchor) or even to a remote server.

In step 360, the differences in arrival time of the clap message are calculated, taking into account the synchronisation relationships between the anchors. To do this, it is in particular possible to convert the arrival times measured by the local clocks into arrival times measured by the reference clock, then calculate the differences in arrival time.

In step 370, the position of the tag is estimated on the basis of the positions (known) of the anchors and the differences in arrival time (TDOA). This estimation of position by TDOA is well known per se and will not be described in detail here.

Steps 360 and 370 can be carried out by the reference anchor (more generally the coordinating anchor) or the remote server according to the entity in charge of the location.

It is important to note that the location method described above does not require the tag to have a UWB receiver. It is thus possible to save the energy spent by the tag and increase its battery life. In a practical manner, the tags can thus be powered simply by button cells.

FIGS. 4A and 4B schematically show sequences of UWB superframes and narrowband superframes for a location method according to a second embodiment of the invention. The sequences of superframes of FIG. 4B follow the sequences of superframes of FIG. 4A.

$410_1, \ldots, 410_N$ represent the successive narrowband superframes and $420_1, \ldots, 420_N$ represent the UWB superframes. $411_1, \ldots, 411_N$ designate the beacons of the auxiliary channel and $421_1, \ldots, 421_N$ designate the beacons of the UWB channel.

It is supposed here that the tag is provided with a device for detecting movement. Since the movement is rarely linear and at a constant speed, an accelerometer can be used to do this, for example a MEMS accelerometer.

In 470, the detection device detects a movement of the tag. The latter thus requests in 473 (via the auxiliary channel), during the following first period of negotiation, an elementary-interval index from the reference anchor. An index is assigned to it (via the auxiliary channel) in 475, here during the same negotiation period. The tag then deactivates its narrowband receiver immediately afterward.

In parallel, as soon as the tag has been allocated an elementary-interval index, said tag emits in 480 a clap message in the first elementary interval corresponding to this index that follows a beacon signal, or $421_2$ in the example illustrated. It continues to emit its clap messages during the following UWB superframes, always in the same elementary interval corresponding to the index that has been assigned to it.

When no movement has been detected by the motion sensor during a first time interval having a given length, the tag stops transmitting its clap messages.

When the reference anchor (or the coordinating anchor in charge of the tag) detects that no clap message has been detected during a second time interval having a given length, said anchor frees the intermediate-interval index in 485. If the tag later moves again, it must then transmit a new request for allocation of an elementary interval in order to emit a clap message.

It is possible for a new allocation request to only be transmitted to the reference anchor if its movement has not been detected over a period of sufficiently long, in such a way as to avoid the sending of untimely requests.

What is claimed is:

1. A method for location of a tag by a network of sensors, the network of sensors comprising a reference anchor and a plurality of anchors synchronised with said reference anchor, the reference anchor emitting a UWB signal comprising first beacons at regular intervals, an interval between two successive first beacons defining a first time frame comprising elementary time intervals during which the sensors and the tag can access a UWB channel, said method further comprising:

a transmission by the reference anchor of a narrowband signal over an auxiliary channel, the narrowband signal comprising second beacons at regular intervals, the interval between two successive second beacons defining a second time frame, the second beacons being synchronous with the first beacons, the reference anchor transmitting an elementary-interval index to said tag during the second time frame when requested by the tag on the auxiliary channel;

a reception (320) by said tag of said index over the auxiliary channel and the transmission (340) by said tag of a clap message over the UWB channel during an elementary interval associated with said index;

a reception (350) by said anchors of the clap message and a determination (360) of differences in arrival time of this message to the various anchors;

a calculation (370) of the position of the tag on the basis of the differences in arrival time thus determined.

2. The method for location of a tag by a network of sensors according to claim 1, wherein said tag is provided with a narrowband emitter/receiver adapted for emitting/receiving over the auxiliary channel and places its narrowband receiver on standby (330) after having received the elementary-interval index allocated by the reference anchor.

3. The method for location of a tag by a network of sensors according to claim 1, wherein said tag is provided with a UWB emitter without an associated UWB receiver.

4. The method for location of a tag by a network of sensors according to claim 1, wherein said tag is provided with a motion sensor and that said tag transmits a request for an elementary-interval index to the reference node when a movement of the tag is detected.

5. The method for location of a tag by a network of sensors according to claim 4, wherein said tag only emits the request for an elementary-interval index if said movement lasts longer than a predetermined period of time.

6. The method for location of a tag by a network of sensors according to claim 1, wherein if the reference anchor does not receive any clap message from the tag during an interval having a predetermined length, the reference anchor frees the elementary-interval index allocated to the tag.

7. The method for location of a tag by a network of sensors according to claim 1, wherein the UWB signal is compliant with a physical layer standardised by a standard IEEE 802.15.4a and that the access to the UWB channel is compliant with a MAC layer standardised by this standard.

8. The method for location of a tag by a network of sensors according to claim 1, wherein the narrowband signal is compliant with a physical layer standardised by a standard IEEE 802.15.4 at 2.4 GHz and that the access to the auxiliary channel is compliant with a MAC layer standardised by this standard.

9. The method for location of a tag by a network of sensors according to claim 1, wherein the narrowband signal is an RFID signal.

10. The method for location of a tag by a network of sensors according to claim 1, wherein the narrowband signal is a Bluetooth Low Energy signal.

* * * * *